United States Patent [19]

Rizzo, Sr.

[11] Patent Number: 4,494,644
[45] Date of Patent: Jan. 22, 1985

[54] CONVEYOR SYSTEM

[75] Inventor: Joseph P. Rizzo, Sr., Lester, Pa.

[73] Assignee: Scott Paper Company, Philadelphia, Pa.

[21] Appl. No.: 455,374

[22] Filed: Jan. 3, 1983

[51] Int. Cl.³ .............................................. B65G 47/24
[52] U.S. Cl. .................................. 198/409; 198/489; 198/492; 53/313; 53/534
[58] Field of Search ............... 198/409, 420, 424, 425, 198/432, 489, 490, 492, 656, 535; 53/247, 251, 300, 313, 534

[56] References Cited

U.S. PATENT DOCUMENTS

| | | | |
|---|---|---|---|
| 1,571,269 | 2/1926 | Jaeger | 53/313 |
| 1,906,147 | 4/1933 | Gardiner | 198/656 |
| 2,949,995 | 8/1960 | Welch | 198/656 |
| 3,354,613 | 11/1967 | Anderson et al. | 53/251 |
| 3,601,952 | 8/1971 | Cato | 53/534 |
| 4,228,901 | 10/1980 | Watzka et al. | 198/489 |
| 4,418,815 | 12/1983 | Anderson et al. | 198/656 |

Primary Examiner—Joseph E. Valenza
Attorney, Agent, or Firm—John W. Kane; Joseph H. Yamaoka

[57] ABSTRACT

A conveyor system for flanged containers includes downwardly inclined, laterally-spaced rails for supporting the flanges of the containers as the containers move by gravity toward a take-away conveyor. Control means are provided for permitting each container to move by gravity on the rails into engagement with a leading edge of an adjacent aperture in the take-away conveyor with flanges of each container still supported by a lower section of the spaced rails. Preferably the lower section is movable, and an actuating system is provided for moving it to positively direct a lower trailing end of each container into its adjacent aperture.

7 Claims, 7 Drawing Figures

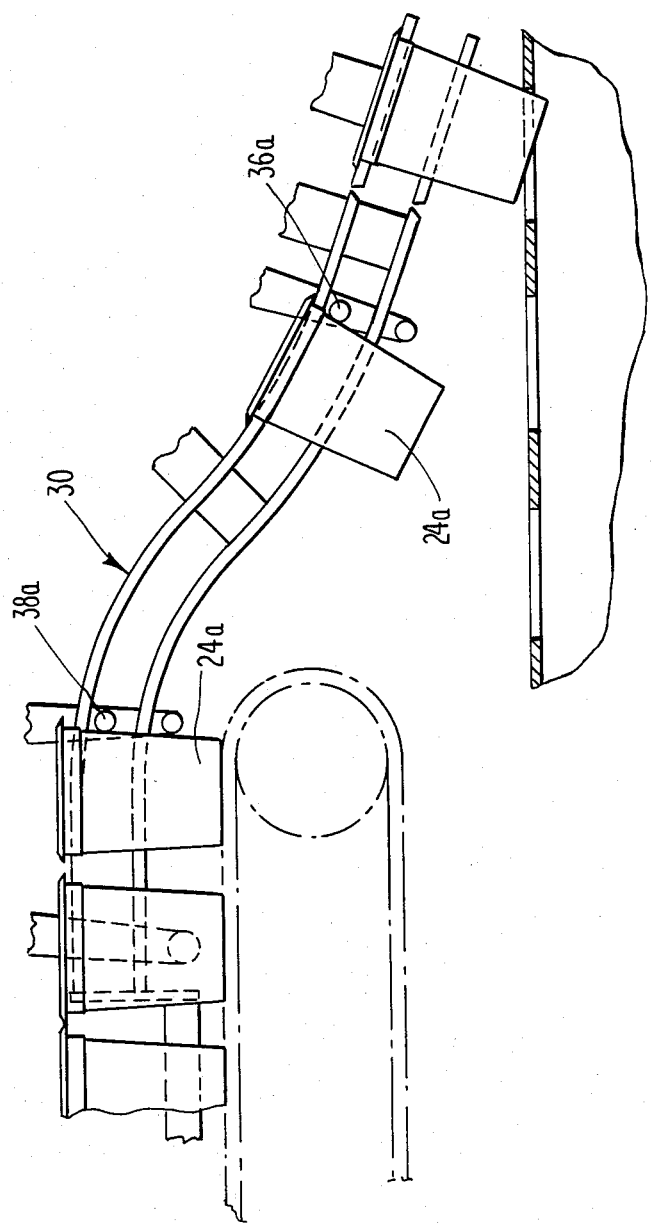

CONVEYOR SYSTEM

TECHNICAL FIELD

This invention relates generally to a conveyor system, and more specifically to a system for conveying flanged containers into apertures of a take-away conveyor.

BACKGROUND ART

In the manufacture of Baby Fresh premoistened wipes, a stack of towelettes, or tissues is inserted into a flanged container prior to directing the container to a liquid impregnating system of the type described in U.S. Pat. No. 4,189,896, issued to Kolbach et al, at which the desired liquid is introduced into the stack of towelettes. After the impregnating operation a moisture-impervious foil seal is adhered to the top surface of the peripheral flange of the container, and thereafter, a hinged lid is connected to the container to complete the package. The overall package design is described and claimed in U.S. Pat. No. 3,904,074, and is herein incorporated by reference. Also, to the extent necessary to completely understand this invention, the above-referenced '896 patent also is incorporated by reference.

One type of apparatus that has been successfully employed to heat seal the foil sheet over the top surface of the container is a Colunio model 12000 heat sealing system. This device is sold by Caleb Duckworth Ltd., Manton Lane, Bedford England. Prior to the instant invention, the containers of impregnated product, after leaving the impregnating system disclosed in the '896 patent, were manually positioned into apertures of a conveyor system associated with the Colunio heat sealing device. The apertures were dimensioned to closely circumscribe the container adjacent the upper periphery of the body so that the outwardly directed flanges of the container would seat on the upper surface of the conveyor. With the flange so supported, a heat sealing press was employed to bond the foil sheet to the upper surface thereof.

As should be apparent, the manual loading of containers into apertures of the Colunio conveyor is inherently an extremely inefficient, slow operation.

The following patents directed to article conveying systems were considered in the preparation of this application; however, none of these systems are believed to provide any significant teachings with respect to the automatic feeding of flanged containers into apertures of a conveyor, as is contemplated by the present invention:

U.S. Pat. No. 1,726,054: Burns
U.S. Pat. No. 1,889,846: Wright
U.S. Pat. No. 2,193,942: Shackelford
U.S. Pat. No. 4,228,901: Watzka et al.

The system disclosed in the Watzka et al. patent employs a gravity conveying system in the form of an inclined path 1 for directing articles 4 onto a pivot plate 7. This plate can then be moved to a lower plane to position the articles onto a take-away conveyor. This patent does not relate, in any way, to the gravity feeding of flanged containers into apertures of a conveyor.

DISCLOSURE OF INVENTION

A conveying system for a flanged container employs downwardly inclined, laterally spaced-apart rails for supporting the flanges of the container as said container moves by gravity to a lower section of said spaced-apart rails, a take-away conveyor positioned adjacent the lower section of the spaced-apart rails, said conveyor including apertures therein, each aperture including a leading edge positioned for engaging a downstream edge of a container while said container is still supported on the lower section of said spaced-apart rails in a tilted position with a lower trailing end of the container being disposed outside of said aperture.

In accordance with the broadest aspect of this invention the trailing end of the container is caused to pivot into the aperture by merely moving the take-away conveyor. This movement, in conjunction with the location of the center of gravity of the tilted container, will cause the container to move forwardly (in a downstream direction) and tilt rearwardly into the aperture when the take-away conveyor is moved. However, in systems wherein the tolerances between the dimensions of the aperture and the peripheral dimensions of the container are quite close, it is desirable to positively direct, or insert the trailing end of the container into the aperture, rather than relying upon movement of the take-away conveyor and gravity to carry out this operation. To accomplish this operation the lower section of the spaced-apart rails, in the preferred embodiment of the invention, is constructed as a movable section, and actuating means are employed for actually moving the lower movable section in a manner to positively direct the lower trailing end of the container into the aperture, after the forward, or downstream end of the container has engaged the leading edge of said aperture. Continued movement of the take-away conveyor will strip the container off of the spaced-apart rails by the physical engagement of the trailing, or upstream edge of the aperture with the trailing, or upstream edge of the container.

In the preferred embodiment of this invention a first stop means having a container-engaging projection is provided for contacting a container located in a downwardly inclined region of the spaced-apart rails for preventing its further downward movement, and control means are operative to move said first stop means to release the container, and thereby permit its movement against the leading edge of said aperture with the take-away conveyor in a dwell period. In this manner the leading edge of the aperture acts as a stop for the container, and also functions to properly position, or orient the container for the subsequent insertion operation accomplished by the operation of the movable section of the spaced-apart rails. This technique of engaging the container with the leading edge of an aperture does not require close tolerances in the operation of the equipment. So long as the leading edge of the aperture is positioned to intercept the container while it still is supported on the rails, the conveyor system will function properly.

In the most preferred embodiment of the invention the movable section of the spaced-apart rails is mounted for rotation about an axis positioned below and downstream thereof. This results in the rails being pivoted in a slightly rearward, or upstream direction to tilt the container supported thereby into a substantially horizontal position, with a trailing end of the container positioned inside, and overlying a trailing edge of the aperture. This technique for moving the rail tends to prevent the rear edge of the container from being damaged by hitting the trailing edge of the aperture during the container-inserting operation.

Most preferably a series of stops are provided along the path of travel of a plurality containers on the spaced-apart rails to positively control the location and movement of the containers for assuring that they are sequentially directed, one-at-a-time, into spaced-apart apertures in the conveyor. Also, a series of photocells can be provided to detect malfunctions at various locations, and to shut-down the system in response to a detected malfunction.

Although the invention can be used in a wide variety of applications in which flanged containers need to be positioned in apertures of a conveyor, the invention is particularly well suited for receiving flanged containers of impregnated tissues directed by an exit conveyor out of the impregnating system described in the '896 patent, and automatically directing these containers into apertures of the inlet conveyor of a Colunio heat sealing device in which a foil sheet is heat sealed to the upper periphery of the container to prevent evaporation of the impregnating liquid.

Other objects and advantages of this invention will become apparent by referring to the Description of the Best Mode of the Invention which follows, taken in conjunction with the drawings.

BRIEF DESCRIPTION OF THE DRAWINGS

FIG. 7 is a somewhat schematic, fragmentary sectional view, similar to FIG. 4, but showing the manner in which the conveyor system of this invention can be employed to handle containers that are taller, or larger than those illustrated in FIGS. 2–6.

BEST MODE OF THE INVENTION

Figure 1:
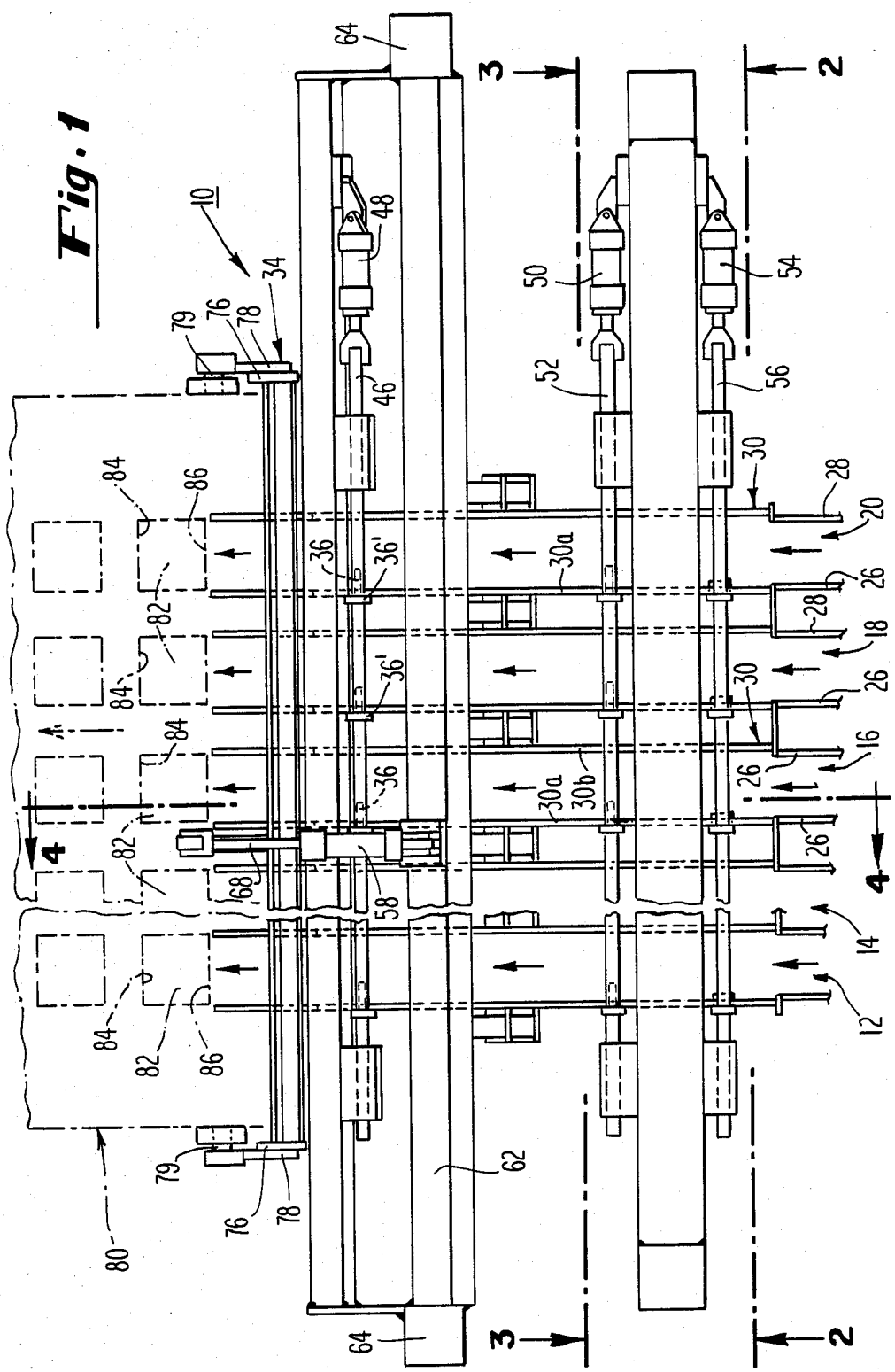
FIG. 1 is a fragmentary plan view of the conveyor system of this invention with the containers handled thereby being omitted to more clearly show details of construction of said system.

Referring to FIG. 1, a multi-station conveyor system 10 of this invention includes a plurality of identical stations; five of them being indicated at 12, 14, 16, 18 and 20. It should be understood that the exact number of stations can be varied, depending upon the production needs of the manufacturer.

Referring to FIGS. 1–4, an inlet conveyor 22 is provided for directing flanged containers 24 between spaced-apart supporting rails 26 and 28 associated with each station. It should be noted that the inlet conveyor 22 can actually be the outlet conveyor of the impregnating device disclosed in U.S. Pat. No. 4,189,896, and referenced earlier in this application.

Figure 2:
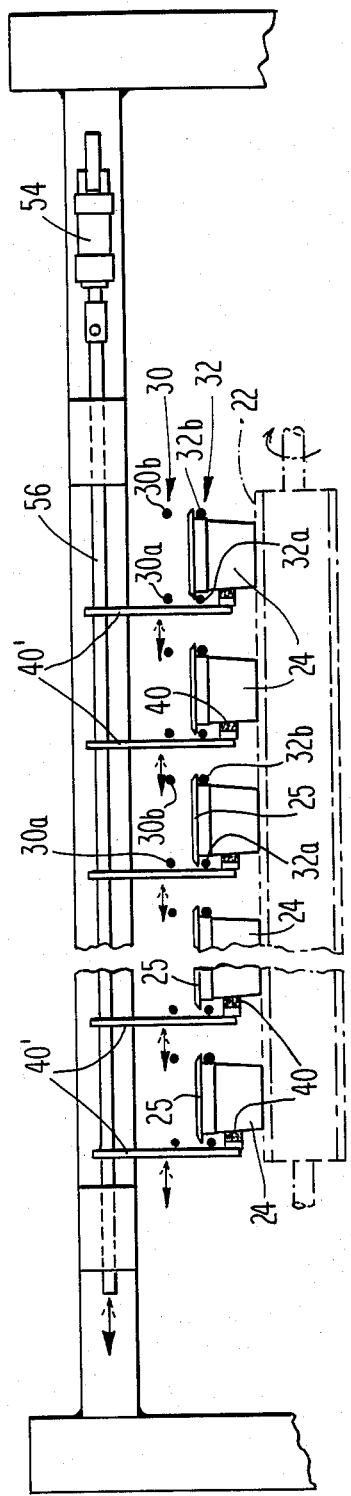
FIG. 2 is a transverse sectional view along line 2—2 of FIG. 1, but with the containers handled by the system being shown.
Figure 4:
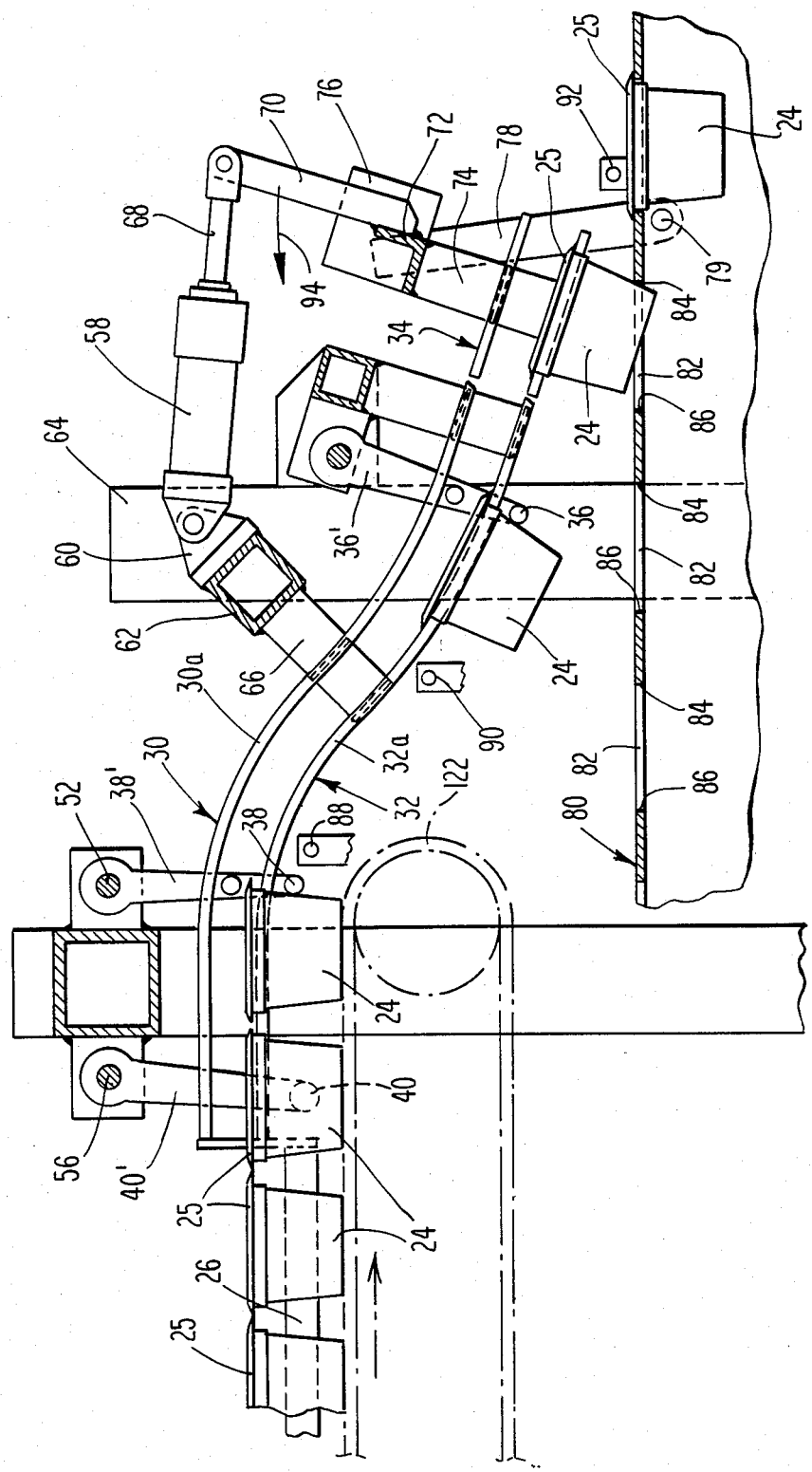
FIG. 4 is a longitudinal sectional view along line 4—4 of FIG. 1, illustrating the position of the various containers during a part of the operating cycle of the conveyor system.

Referring to FIGS. 1, 2 and 4, the conveyor system 10, in the most preferred embodiment of this invention, is provided with upper and lower rail sets, 30 and 32 respectively, at each station for the purpose of accommodating different sized containers. The upper set 30 includes laterally spaced-apart rails 30a and 30b, and the lower set 32 includes laterally spaced-apart rails 32a and 32b. In the illustrated embodiment the rails in the upper set are laterally spaced-apart the same distance as the rails in the lower set, and with this arrangement, the system 10 is designed to accommodate containers having substantially the same width, but differing heights. The specific mode of operation will be described in detail in connection with the handling of the smaller-sized containers adapted to be conveyed by the spaced-apart rails 32a and 32b of the lower rail set 32.

Referring to FIGS. 2 and 4, the inlet conveyor 22 is operated to feed a plurality of containers 24, in seriatim, between the lower spaced-apart rails 32a and 32b, with the peripheral flange 25 of said container overlying said rails. It should be noted that both rail sets 30 and 32 are substantially identical in construction, and include an upstream, substantially horizontal end joined through a curved region to a downwardly inclined section. A movable section 34, constituting the most downstream end of the upper and lower rails, is operative to assist in transferring containers from the rails to a take-away conveyor 80, in a manner to be described later in this application.

Referring specifically to FIGS. 1–4, the conveyor system of this invention includes a series of three stops 36, 38 and 40, secured to downwardly directed arms 36', 38' and 40' respectively. These stops are provided to interrupt the path of travel of containers 24 in each station, in a predetermined manner and under the control of a Gemco electronic control unit, as will be described in greater detail hereinafter. The most downstream arms 36' carrying the stops 36 are secured to a laterally extending shaft 46 that, in turn, is adapted to be reciprocated by a fluid cylinder 48; preferably pneumatic. In a line manner a pneumatic cylinder 50 is employed for laterally reciprocating a laterally extending shaft 52 to which are secured the arms 38' carrying the stops 38. Also, a pneumatic cylinder 54 is employed for laterally reciprocating a laterally extending shaft 56 to which are secured the upstream arms 40' carrying the stops 40.

Figure 3:
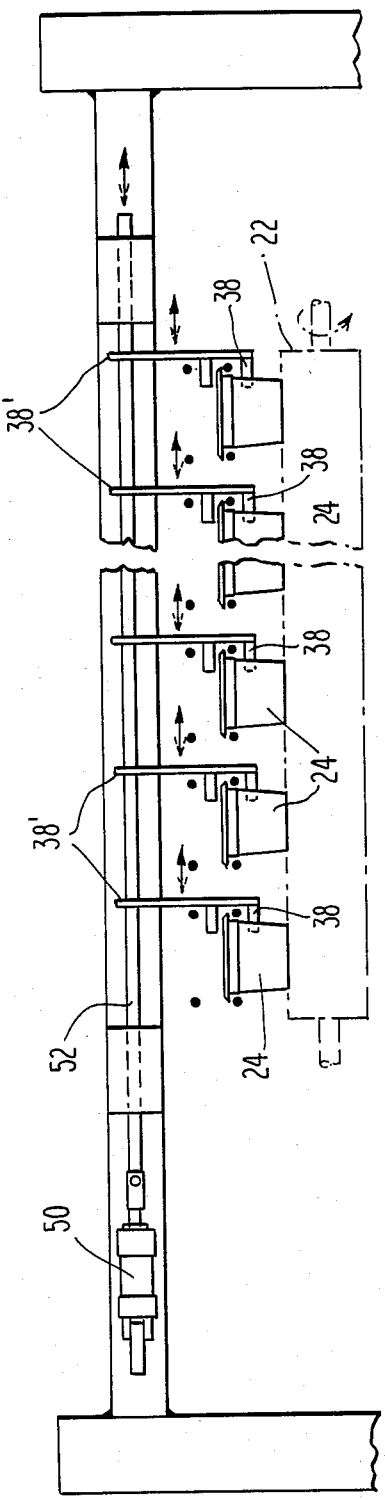
FIG. 3 is a transverse sectional view along line 3—3 of FIG. 1, but with the containers handled by the system being shown.

As can be seen best in FIGS. 2 and 4, the upstream stops 40 are in the form pads adapted to press against, and thereby immobolize containers 24. As illustrated in FIGS. 3 ad 4, the stops 38 and 36 are in the form of laterally projecting pins adapted to actually move in front of the containers to stop their movement. It should also be noted that stops 38a and 40a, mounted to the arms 38' and 40' above the stops 38 and 40, are intended to provide exactly the same functions as the stops 38 and 40, respectively, but in connection with the handling of taller containers, as will be described later in connection with FIG. 7.

Referring specifically to FIGS. 1 and 4, the structural arrangement for mounting the movable section 34 of the upper and lower rail sets 30 and 32 will now be described. A pneumatic cylinder 58 is pivotally attached to a bracket 60 that, in turn, is secured, such as by bolts or the like (not shown), to a laterally extending frame member 62. This latter frame member is supported at opposite ends by vertical frame members 64 of the conveyor system 10. It should be mentioned that any well known supporting structure can be employed to actually maintain the sets of rails in their desired orientation. In the illustrated embodiment a plurality of laterally spaced-apart supports (only one being illustrated at 66 in FIG. 4) are secured to the laterally extending frame member 62, and then are welded, or otherwise attached to the end margins of the upper and lower rail sets 30 and 32 to assist in supporting them. Similar downwardly directed supports can be employed in connection with other laterally extending frame members of the system to provide the additional support required for the rail sets.

Still referring to FIGS. 1 and 4, a piston rod 68 of the pneumatic cylinder 58 is pivotally connected to a link 70 which, in turn, is secured to laterally extending, L-shaped bracket 72. This L-shaped bracket actually supports the movable section 34 of the rail sets through a series of laterally spaced, downwardly directed support members (only one being shown at 74 in FIG. 4) secured at one end, such as by welding, to the lower surface of bracket 72, and also secured, such as by welding, to opposite sides of the rails 30a and 30b of the upper rail set, and to rails 32a and 32b of the lower rail set. The L-shaped bracket 72 is further secured to end support members 76 which, in turn, are fixedly attached to one end of pivot control link 78, such as by welding, bolting or the like. The opposite end of each pivot control link is pivotally secured at 79 below, and downstream of the movable section 34 to a peripheral side wall of the take-away conveyor 80. In a preferred embodiment of this invention the take-away conveyor is actually the inlet conveyor of a Colunio heat sealing device.

As can be seen best in FIGS. 1 and 4, the take-away conveyor 80 includes a series of apertures 82 aligned with each of the conveyor stations 12, 14, 16, 18 and 20. Each of these apertures includes a leading, or downstream edge 84 and an upstream, or trailing edge 86, between which the containers 24 are adapted to be directed by the conveyor system 10 of this invention.

Referring to FIG. 4, a series of three photoelectric cells 88, 90 and 92 are employed for monitoring the operation of the conveyor system 10, and for shutting it down in the event of an undesired malfunction. The manner in which these photoelectric cells operate will be described hereinafter.

Having described the various elements of the conveyor system 10, its mode of operation will be now be described in detail. For purposes of description the mode of operation will be described from a point in time beginning when a container 24 is being engaged by lower stop 36, the front most container on inlet conveyor 22 is engaged by stop 38 and the next adjacent container on the inlet conveyor 22 is engaged, and immobilized by the pad 40. At this point in the operation there is no container located in the region of movable section 34 or in the take-away conveyor 80, as presently is illustrated in FIG. 4.

As the take-away conveyor 80 is about to come to a dwell, but before it actually stops, the Gemco electronic control unit will operate pneumatic cylinder 48 to retract the downstream stops 36, and thereby permit the containers engaged thereby in each of the stations to move, by gravity, toward the take-away conveyor 80. The operation is timed so that the take-away conveyor 80 actually will come to a complete stop, and be in a dwell period, at the time that the containers released by the stops 36 actually reach it. It should be noted that the speed of operation of the conveyor system 10 is enhanced by permitting the containers engaged by the stops 36 to begin their downward traverse toward the take-away conveyor 80 prior to the dwell period of the conveyor actually being reached. It should be apparent that the operation of the conveyor system 10 is controlled so that an aperture 82 of the conveyor 80 will be adjacent to the downstream end of each movable section 34 of the rail set 32 so that a leading sidewall of each container will actually be moved into engagement with a leading edge 84 of its adjacent aperture. At this point in the operation each of the containers is in a tilted, or canted position relative to the planar surface of the conveyor, and its further movement is prevented by its engagement with the leading downstream edge 84 of the aperture 82.

The lowermost stops 36 are controlled so that they will retract for only a short period of time, sufficient to permit the containers engaged thereby to clear them. Thereafter, the stops 36 will be moved back into the path of travel of the containers to thereby be in a position to stop the next containers moved toward them.

During all parts of the operation described thus far the upstream stops, or pads 40 remain in engagement with a side wall of the container in each station that is immediately behind the leading, or most downstream container in the region of the inlet conveyor 22.

At a predetermined short period of time after the downstream stops 36 have been retracted, and before they have been moved back into the path of travel of the containers, the intermediate stops 38 also are retracted to permit the containers immobilized thereby to move by contact with the driven conveyor 22, and then by gravity toward the downstream stops 36. The pin stops 38 also will be retracted for only a short period of time, sufficient to allow only a single container in each station to pass them, and thereafter said stops will be moved back into a position interrupting the path of travel of the containers to engage the next container in each station (that container previously engaged by the upstream pad 40). In the meantime, as the container released by the pin stop 38 in each station moves by gravity along spaced-apart rails 32a and 32b, the downstream stops 36 will be moved back into a position overlying the path of travel of the containers to thereby engage, and stop the movement of the containers directed to said stops. After the intermediate pin stops 38 are moved back into a position overlying the path of travel of the containers, the pads 40 are retracted to allow the containers engaged thereby to move into engagement with said pin stops 38. Operation of the pads 40 is timed to move them into engagement with a sidewall of the next adjacent container in each station being moved forwardly by the inlet conveyor 22.

In this point of the operation of the system 10 the containers 24 will occupy the various positions illustrated in FIG. 4, with the possible exception, that the most downstream container shown fully seated in the take-away conveyor 80 may not be present.

Figure 5:
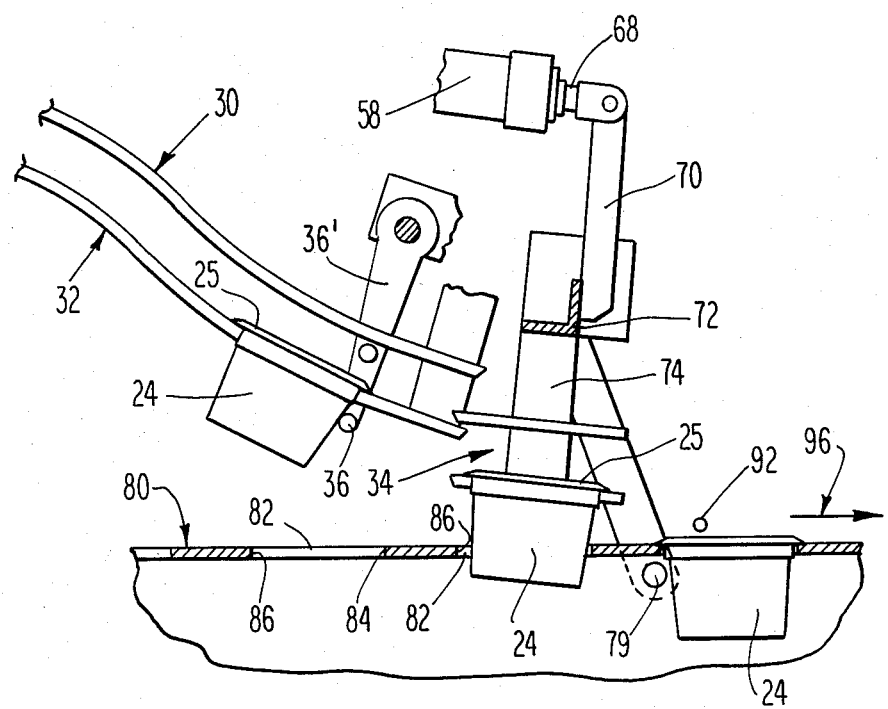
FIGS. 5 and 6 are fragmentary sectional views of the downstream end of the conveyor system illustrating different stages in the operation of the conveyor system subsequent to the stage illustrated in FIG. 4.
Figure 6:
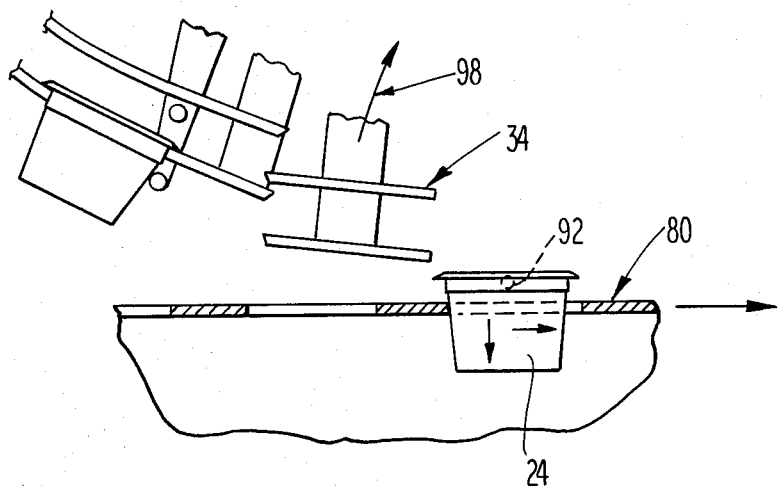

Referring to FIGS. 1, 4 and 5, the manner in which the movable sections 34 are operated will now be described, and this operation will take place before the stops 36 are again retracted to permit the subsequent movement of another container in each station into the region of a movable section 34. The movable sections 34 are operated for the purpose of positively directing the lower trailing, or upstream edge of the containers from their canted position outside aperture 82 into a generally horizontal position inside of said aperture. To accomplish this result the piston rod 68 is retracted to rotate the L-shaped bracket 72, through connecting link 70, in the general direction indicated by arrow 94 in FIG. 4. This movement will cause a tilting of the containers 24 into the general position illustrated in FIG. 5, with the lower trailing edges of the containers positioned inside adjacent apertures 82, forward of the upstream edges 86 thereof. In this orientation the containers 24 can be stripped from the movable sections 34 by movement of the take-away conveyor 80 without damaging the edges of said containers. Note that as take-away conveyor 80 is moved in the general direction indicated by arrow 96, the upstream edge 86 of each aperture 82 will be moved into engagement with an adjacent sidewall of a container 24 in said aperture, and thereafter strip said container off of the laterally spaced-apart supporting rails 32a and 32b associated with the movable section 34. The arrangement of elements after stripping of the container 24 from the movable section 34 is illustrated in FIG. 6. At this point in the operation the piston rod 68 is extended to direct the movable section 34 in the general direction of arrow 98 back into the position illustrated in FIG. 4. This will reposition the movable section in alignment with the remainder of the rail set so that it will be adapted to receive the next adjacent container.

At this point in the operation the sequence of steps, as described above is repeated, with the first step being to retract the downstream most stop 36 as the take-away conveyor 80 is about to come to a dwell, but before it actually stops.

Turning generally to FIG. 7, the manner in which larger flanged containers 24a are handled is illustrated. Note that the conveyor system handles these larger containers in the identical manner described above in connection with the handling of the smaller containers. The only difference being that the larger flanged containers are supported on the spaced-apart rails of the upper rail set 30, and the stops 36a and 38a associated, respectively, with the same support arms 36' and 38' as the stops 36 and 38, provide control over movement of the containers 24a in the identical manner that the stops 36 and 38 provide control over the movement of the containers 24.

Turning in particular to FIG. 4, the three photoelectric cells 88, 90 and 92 are operative to stop the operation of the conveyor system 10 in the event of an improper feeding of the containers. The photoelectric cell 88 is located immediately downstream of the intermediate stops 38. In the event that this cell senses a container in front of it for a length of time greater than is needed for a single container to pass it, it will automatically prevent further operation of the various stops until the system is cleared and then reset. This can be accomplished by disconnecting the power input to the Gemco unit. The intermediate photoelectric cell 90 is located upstream of the stops 36, a distance greater than the lateral dimension of the container. Thus, if the containers are properly seated against the stops 36 they should not interrupt the cell 90. In the event that the photoelectric cell 90 is interrupted by a container for a period of time greater than is required for a single container to pass it, thereby indicating a malfunction in the feed, then the machine would shut down in the same manner indicated above in connection with the operation of photocell 88. The additional photocell 92 is positioned downstream of the rails, and slightly above the upper surface of the take-away conveyor at a location where the container should be fully seated within the conveyor aperture. In the event that the container is still in a canted position, or otherwise not fully seated, it will intercept the photocell to thereby indicate improper orientation of said container. If this occurs the conveyor system likewise will be shut down in the manner indicated above.

I claim:

1. An improved conveying system for a flanged container said system comprising downwardly inclined, laterally-spaced rails for supporting the flanges of the container as the container moves by gravity toward a lower section of said laterally-spaced rails, a take-away conveyor having apertures therein and being positioned in close proximity to the lower section of the laterally-spaced rails for permitting a leading downstream edge of a container to engage a leading edge of an aperture with flanges of said container supported by said lower section of the laterally-spaced rails and said container being in a canted orientation with a lower trailing end thereof located above said aperture; the improvement characterized in that the lower section of the spaced-apart rails is mounted for rotational movement about an axis located downstream and below said lower section and additionally comprising actuating means for rotating said movable lower section to positively direct the lower trailing end of the container into the aperture.

2. The conveying system of claim 1 characterized by the inclusion of a first stop means having a container-engaging projection for contacting a container located in a downwardly inclined region of the spaced-apart rails for preventing its further downward movement, and control means for disengaging said projection from contact with said container to permit gravity movement of the container into engagement with the leading edge of the aperture when the take-away conveyor is in a dwell period.

3. The conveying system of claim 2 characterized by additional container engaging stop means upstream of said first stop means for controlling the movement of containers so that only a single container is fed to said first stop means prior to each disengagement of the projection from contact with said container, whereby each disengagement of said projection will permit only a single container to move by gravity into engagement with the leading edge of an aperture in the take-away conveyor.

4. A method of conveying flanged containers into apertures of a take-away conveyor including the steps of:
engaging the underside of laterally spaced-apart flanges of the container with downwardly inclined, laterally spaced-apart rails;
permitting each container to move by gravity on the spaced-apart rails onto a movable section of the spaced-apart rails wherein a wall of the container engages a leading edge of an aperture in the take-away conveyor with the container canted relative to the horizontal;
rotating the movable section of the spaced-apart rails about an axis located downstream and below the movable rail section so as to move the container into a generally horizontal orientation with a rear wall of the container inserted into the aperture and thereafter;
moving the conveyor to strip the container off of the laterally spaced-apart supporting rails.

5. The method of claim 4 characterized by the step of stopping the movement of a container while it is in a downwardly inclined region of the spaced-apart rails; releasing the container for permitting it to move by gravity along the spaced-apart rails into engagement with the leading edge of the aperture in the take-away conveyor and maintaining said conveyor in a period of dwell when said container initially engages the leading edge of the aperture.

6. The method of claim 5 characterized by the step of releasing the container while the take-away conveyor is still moving.

7. The method of claim 6 characterized by the step of repositioning the movable section of the spaced-apart rails in alignment with an adjacent upstream section of the rails after the container has been stripped from the movable section by movement of the take-away conveyor.

* * * * *